United States Patent [19]

Goldenberg et al.

[11] Patent Number: 4,670,506

[45] Date of Patent: Jun. 2, 1987

[54] POLYVINYL ALCOHOL DERIVATIVES CONTAINING PENDANT (METH)ACRYLOYL UNITS BOUND THROUGH URETHANE GROUPS AND CROSSLINKED HYDROGEL CONTACT LENSES MADE THEREFROM

[75] Inventors: Merrill Goldenberg, Teaneck, N.J.; Karl F. Mueller, New York, N.Y.

[73] Assignee: Ciba-Geigy Corporation, Ardsley, N.Y.

[21] Appl. No.: 812,651

[22] Filed: Dec. 23, 1985

[51] Int. Cl.$^4$ .............................................. C08F 8/30
[52] U.S. Cl. .................................. 525/59; 351/160 R
[58] Field of Search ........................................ 525/59

[56] References Cited

U.S. PATENT DOCUMENTS 3,928,299 12/1975 Rosenkranz et al. ................ 526/310

Primary Examiner—Jacob Ziegler
Attorney, Agent, or Firm—Michael W. Glynn; Irving M. Fishman

[57] ABSTRACT

Organic aprotic solvent soluble polymers which are derivatives of a polyvinyl alcohol, having a weight average molecular weight of at least about 2,000, and containing from about 0.5 to about 90 percent, based on the number of hydroxyl groups in said polyvinyl alcohol, of units of the formula

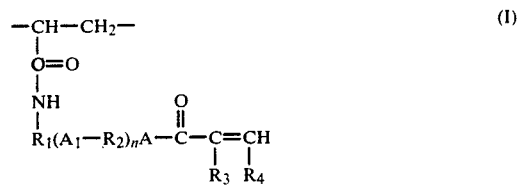

wherein $R_1$ and $R_2$ are independently alkylene, arylene, cycloaliphatic, aralkylene or aralkarylene, n is 0 or 1, $A_1$ is a carbamoyloxy or ureido linking group, A is an oxa, imino or ureido group, $R_3$ is hydrogen or methyl, $R_4$ is hydrogen, or when $R_3$ is hydrogen, methyl or also -COOR$_5$ where $B_5$ is hydrogen or lower alkyl, and crosslinked hydrogel contact lenses made therefrom and their preparation.

13 Claims, No Drawings ns, as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior hydrogel polymers generally suffer from several inherent problems (a) relatively weak mechanical strength, low dissolved oxygen permeability or a combination of both (b) most lenses are made by either of two procedures, one requiring costly lathing and polishing steps and the other using delicate spin casting techniques where polymerization, crosslinking, and shaping are done simultaneously.

POLYVINYL ALCOHOL DERIVATIVES CONTAINING PENDANT (METH)ACRYLOYL UNITS BOUND THROUGH URETHANE GROUPS AND CROSSLINKED HYDROGEL CONTACT LENSES MADE THEREFROM

BACKGROUND OF THE INVENTION

The instant invention relates to polyvinyl alcohol (PVA) derivatives containing pendant (meth)acryloyl units bound to the polyvinyl alcohol backbone, through urethane groups, which can be crosslinked to form soft hydrogel contact lenses possessing high oxygen permeability and mechanical strength and capable of being sterilized in either boiling water or dilute hydrogen peroxide solutions.

In general, most existing hydrogel soft contact lens materials are based on HEMA, also known as hydroxyethyl methacrylate or as ethyleneglycol monomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior hydrogel polymers generally suffer from several inherent problems (a) relatively weak mechanical strength, low dissolved oxygen permeability or a combination of both (b) most lenses are made by either of two procedures, one requiring costly lathing and polishing steps and the other using delicate spin casting techniques where polymerization, crosslinking, and shaping are done simultaneously.

Polyvinyl alcohol has also been proposed as a contact lens material. Several reagents have been suggested to crosslink PVA for this purpose: formalin and acid catalysis, Japanese Patent 72/06910; dialdehyde of PVA with PVA and acid catalysis, Japanese Patent application No. 50/115258; and glyoxal, U.S. Pat. No. 3,408,429. These PVA crosslinked materials suffer from hydrolyzable acetal or hemiacetal linkages.

Silberman and Kohn, ACS Polymer Preprints 24, 262-3, 465-6 (1983) and J. Polym. Sci. Chem. 23, 327-336 (1985) prepared 2-benzyloxyethyl-methacrylate (BzOEMA) and graft polymerized it onto PVA by anionic and free radical catalysis. Membranes for contact lens applications were prepared by dissolving the PVA-graft-BzOEMA in dimethyl sulfoxide, casting it on a Teflon surface and immersing it in acetone to precipitate a film which is later swollen in water. However such graft polymerization is generally accompanied by oxidation and degradation of the PVA and by the orientation effects in the casting procedure thereby promoting anisotropy in the mechanical properties.

Grafted PVAs have also been made by procedures that do not involve the formation of a radical on a polymer backbone. For example:

In U.S. Pat. No. 4,085,168 (1978) a PVA-graft copolymer useful as a hydrogel contact lens is made by first forming a hydrophobic macromer, such as polystyrene or polymethylmethacrylate, by an anionic mechanism and capping with a polymerizable (meth)acrylate group. This macromer is then copolymerized free radically with vinyl acetate. After hydrolysis of the acetate group a comb-like structure with a PVA backbone and pendant hydrophobic chains of similar molecular weight is produced. Though clear, transparent films can be produced by this method, the actual chemistry involves several complicated steps some of which require moisture sensitive precautions.

Also in U.S. Pat. No. 4,426,492 (1984) certain carboxylated PVA derivatives, useful as disposable, hydrogel soft contact lenses, are disclosed. It is broadly disclosed that certain carboxylated PVA derivatives may be internally plasticized by esterification with a polyglycolether such as poly(ethyleneglycol). However, esterification reactions are normally difficult to be precisely reproduced, and, in addition, mixing problems may be experienced due to phase separation of two high molecular weight polymers.

PVA has been reacted wih isocyanates forming urethane linkages, for example:

In U.S. Pat. No. 3,776,889 (1973) PVA has been fully reacted with allylisocyanate for use in a photoresist printing plate composition. In U.S. Pat. No. 3,928,299 (1975), isocyanatoethyl methacrylate (IEM) was reacted with certain hydroxyalkyl methacrylate containing polymers forming a urethane linkage and the polymer used in relief printing plates or circuits to form hard, insoluble coatings.

In U.S. Pat. No. Re. 27,401 (1972) Wichterle and Lim prepared a PVA-methacrylate i.e. a PVA that was esterified 1% with methacrylic acid anhydride, dissolved the same to make a 25% aqueous solution, and polymerized the mixture in a flat mold using potassium persulfate and sodium thiosulfate as initiator to form a hydrogel membrane. This type of hydrogel was disclosed for contact lens use. However, such lenses tend to be fragile.

Also in U.S. Pat. No. 4,347,198 (1982) it is disclosed to mix a hydrophilic component, e.g. N-vinyl pyrrolidone, a hydrophobic component, e.g. methyl methacrylate, crosslinking agent and initiator in a solvent, e.g. dimethyl sulfoxide and crosslink the whole mixture in a mold. After equilibration in water a soft hydrogel contact lens is produced. Similarly a lens is disclosed as produced by mixing a polymethylmethacrylate with pendant vinyl groups with N-vinylpyrrolidone and polymerizing the mixture. It is also broadly disclosed to use a PVA esterified with methacrylic acid as the hydrophilic component of a contact lens mixture.

It is an object of the present invention to provide polyvinyl alcohol derivatives containing (meth)acryloyl units which can be crosslinked to form a soft water-swellable hydrogel contact lens having high mechanical strength, medium to high water content, superior optical clarity and high oxygen permeability.

It is a further object of the present invention to provide aqueous swollen contact lenses obviating, or substantially reducing, the drawbacks of the prior art.

It is a further object of the present invention to provide a method of preparing such contact lenses by crosslinking such polyvinyl alcohol containing (meth)acryloyl units in an organic aprotic solvent in a mold, such as a spin cast mold or a static cast mold, and equilibrating the resulting aprotic solvent swollen crosslinked contact lens in an aqueous medium.

DETAILED DESCRIPTION OF THE INVENTION

The instant invention provides an organic aprotic solvent soluble polymer which is a derivative of a polyvinyl alcohol having a weight average molecular weight of at least about 2,000, containing an effective amount between about 0.5 to 90 percent, based on the number of hydroxyl groups on said polyvinyl alcohol, of units of the formula $$-CH-CH_2- \atop {\underset{\underset{R_1(A_1-R_2)_nA-\underset{\underset{R_3}{|}}{C}-\underset{\underset{R_4}{|}}{C}=CH}{|}}{\underset{NH}{|}}{\underset{O=O}{|}}} \quad (I)$$

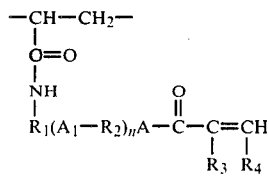

wherein $R_1$ and $R_2$ are independently straight or branched chain alkylene of 2 to 8 carbon atoms, arylene of 6 to 12 carbons atoms, a saturated cycloaliphatic divalent group of 6 to 10 carbon atoms, aralkylene of 7 to 14 carbon atoms, or aralkarylene of 13 to 16 carbon atoms;

n is 0 or 1;

$A_1$ is

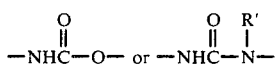

$$-\underset{\underset{O}{\|}}{N}HC-O- \text{ or } -\underset{\underset{O}{\|}}{N}HC-\underset{\underset{R'}{|}}{N}-$$

where R' is hydrogen or lower alkyl;

A is —O—, —NH— or

$$-NHC\underset{\underset{R''}{|}}{O}N-$$

where R" is hydrogen or lower alkyl;

$R_3$ is hydrogen or methyl; and $R_4$ is hydrogen, methyl or —COOR$_5$ where $R_5$ is hydrogen or lower alkyl with the proviso that if $R_3$ is methyl, $R_4$ is hydrogen.

When $R_1$ or $R_2$ are alkylene, they may be straight or branched chain, preferably of 2 to 6 carbon atoms, more preferably straight chain alkylene, and most preferably ethylene. Suitable examples include ethylene, propylene, butylene, hexylene and dimethylethylene.

Where $R_1$ or $R_2$ are arylene, they are preferably phenylene which is unsubstituted or substituted by lower alkyl or lower alkoxy, and more preferably 1,3- or 1,4- phenylene.

Where $R_1$ or $R_2$ are a saturated cycloaliphatic divalent group, such group preferably is cyclohexylene or cyclohexylmethylene which is unsubstituted or substituted by one or more methyl groups, such as the isophorone divalent radical.

Where $R_1$ or $R_2$ are aralkylene, the aryl moiety thereof is preferably phenylene which is unsubstituted or substituted by methyl or methoxy and the alkylene moiety thereof is preferably lower alkylene, such as methylene or ethylene, most preferably methylene.

By the expression, effective amount is meant an amount between the recited ranges sufficient to result in a crosslinked polymer of sufficient mechanical properties so that the resultant crosslinked product is suitable for use as e.g. a contact lens material. As the artisan can appreciate the amount of such units will vary depending on the nature of the units employed but can be easily determined empirically as described in the following examples.

Preferably, there are about 0.5 to 35 percent, more preferably from about 1 to about 30 percent, and most preferably from about 2 to about 20 percent, based upon the number of hydroxyl groups on the polyvinyl alcohol, of units of formula I in said polymer.

The divalent group $A_1$-$R_2$ is present when n is 1 and absent when n is 0; those polymers wherein n is 0 are preferred.

$A_1$, when present, is preferably carbamoyloxy. When $A_1$ is a ureido, R' is preferably hydrogen.

A is preferably —O—. When A is ureido, R" is preferably lower alkyl.

$R_3$ is preferably methyl.

$R_4$ is preferably hydrogen. Where $R_3$ is hydrogen, $R_4$ is methyl or —COOR$_5$, where $R_5$ is preferably methyl or ethyl.

The polyvinyl alcohol polymer derivatives containing units of formula I are easily prepared by reacting a polyvinyl alcohol, having a weight average molecular weight of at least about 2,000, containing i.e. units of the formula $$-CH-CH_2- \atop {\underset{\underset{OH}{|}}{}} \quad (II)$$

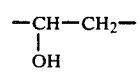

with about 0.5 to about 90 percent, based upon the number of hydroxyl groups in said polyvinyl alcohol, of an isocyanate of the formula $$OCN-R_1(A_1-R_2)_nA-\underset{\underset{R_3}{|}}{C}-\underset{\underset{R_4}{|}}{C}=CH \quad (III)$$

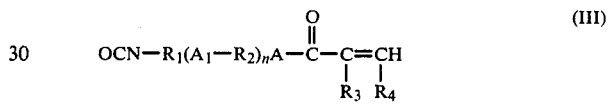

wherein $R_1$, $A_1$, $R_2$, n, A, and $R_3$ are as above defined, and $R_4$ is hydrogen, methyl or —COOR$_5$ were $R_5$ is lower alkyl, at a temperature between about −10° C. to about 100° C. in the presence of a conventional aprotic solvent, in the further presence or absence of a catalytic amount of a urethane catalyst.

To obtain those polyvinyl alcohol polymer derivatives containing units of formula I wherein $R_5$ is hydrogen, the corresponding polymers wherein $R_5$ is lower alkyl can subsequently be treated with aqueous base, such as an alkali metal hydroxide aqueous solution, at an elevated temperature, e.g. between about 40° to about 80° C., followed by neutralization of the resulting carboxylate salt with an acid, such as aqueous hydrochloric acid under ambient conditions.

Suitable aprotic solvents for conducting the reaction between the units of formula II and the isocyanate of formula III include formamide, dimethylformamide, phosphoric acid tri-dimethylamide, N-methyl-2-pyrrolidone, dimethylacetamide, acetamide, acetonitrile and preferably dimethyl sulfoxide.

Suitable urethane catalysts include tertiary amines, such as trimethylamine, triethylamine, N,N-dimethylbenzylamine, or an organometallic urethane catalyst, such as stannous octoate or dibutyltin dilaurate, or sodium acetate.

Polyvinyl alcohols containing units of the formula II are widely available.

Preferably, the polyvinyl alcohol has weight average molecular weight of at least 10,000.

As an upper limit, the polyvinyl alcohol may have a weight average molecular weight of up to 1,000,000. Preferably, the polyvinyl alcohol has a weight average molecular weight of up to 300,000, more preferably up to 100,000, most preferably up to 50,000.

Ordinarily, polyvinyl alcohol predominately possesses a poly(2-hydroxy)ethylene structure. However, the polyvinyl alcohol starting material may also contain hydroxyl groups in the form of 1,2-glycols, such as copolymer units of 1,2-dihydroxyethylene in the chain, obtained for example, by alkaline hydrolysis of vinyl acetate-vinylene carbonate copolymers.

Moreover, the polyvinyl alcohol may contain minor amounts of copolymer units of ethylene, propylene, acrylamide, methacrylamide, dimethylacrylamide, hydroxyethyl methacrylate, methyl methacrylate, methyl acrylate, ethyl acrylate, vinyl pyrrolidone, hydroxyethyl acrylate, allyl alcohol, styrene and the like.

Commercial polyvinyl alcohol resin may be used such as Vinol® 107 manufactured by Air Products (MW=22-31,000, 98-98.8% hydrolyzed). Polysciences 4397 (MW=25,000, 98.5% hydrolyzed), BF 14 by Chan Chun, Elvanol® 90-50 by DuPont, UF-120 by Unitika, Mowiol® 10-98 and 20-98 by Hoechst. Some other manufacturers are Nippon Gohsei (Gohsenol®), Monsanto (Gelvatol®) Wacker (Polyviol) as well as the Japanese manufacturers Kuraray, Denki and Shin-Etsu.

As noted above, copolymers of hydrolyzed vinyl acetate can be used and are commercially available such as hydrolyzed ethylene vinyl acetate (EVA), vinyl chloride-vinylacetate, N-vinyl pyrrolidone-vinyl acetate and maleic anhydride-vinyl acetate.

Polyvinyl alcohol is ordinarily prepared by hydrolysis of the corresponding homopolymeric polyvinyl acetate. In a preferred embodiment the polyvinyl alcohol contains less than 50% polyvinyl acetate units, more preferably less than 20% polyvinyl acetate units.

One method of roughly estimating the weight average molecular weight of polyvinyl alcohol is by the viscosity of a 4% aqueous solution at 20° C.: for example a viscosity of 1-2 cP corresponds to a molecular weight of ~3,000, a viscosity of 7 cP corresponds to a molecular weight of ~25,000 (98-100% hydrolyzed) while a viscosity of 60 cP corresponds to a molecular weight of ~130,000 (99-100% hydrolyzed). Preferably the polyvinyl alcohol should have a minimum viscosity of 2 cP and the upper limit of molecular weight is dictated by the ability to stir and pour solutions without introduction of air bubbles—this value is approximately 60-70 cP. It is important to note that the manufacturers' claim of molecular weight (based on viscosity data) does not necessarily correspond to that obtained by gel permeation chromatography (GPC) which is dependent on the standards used.

TABLE 1

PVA MOLECULAR WEIGHT COMPARISON

| Manufacturer | Manufacturers' Claimed $M_w$ | Viscosity, CPS* | GPC, Mw |
|---|---|---|---|
| Polysciences | 133,000 | — | 66,000 |
| Scientific Polymer Product | 126,000 | 60 | 45,000 |
| Scientific Polymer Products | 115,000 | — | 69,000 |
| Shin-Etsu Poval C25 | 110,000 | 65 ± 8 | 38,000 |
| Air Products Vinol 350 | 106–110,000 | 55 − 65 | 43,000 |
| Hoechst, Moviol 66-100 | 100,000 + | 66 ± 4 | 26,000 |
| DuPont, Elvanol HV | 100,000 + | 55 − 65 | 50,000 |
| Polysciences | 78,000 | 28 − 32 | 37,000 |
| Sigma | 45,000 | 12 − 14 | 30,000 |
| Polysciences | 25,000 | 6 − 8 | 20,000 |
| Aldrich | 14,000 | — | 33,000 |
| Scientific Polymer Products | 14,000 | — | 22,000 |

*4% aqueous solutions at 20° C.

In Table 1 are presented a range of polyvinyl alcohols and the GPC results determined using polyacrylamide standards in aqueous solution.

The weight average molecular weight ranges specified in this disclosure are those obtained by GPC using polyacrylamide standards in aqueous solution.

The isocyanates of formula III are know, per se, or are easily prepared by conventional methods well known in the art (see U.S. Pat. No. 2,958,704).

Where, in the compounds of formula III, n equals 1, the isocyanates can be prepared, for example, by reacting substantial equimolar amounts of a compound of the formula

$$OCN-R_1-NCO \quad (IV)$$

with a compound of the formula

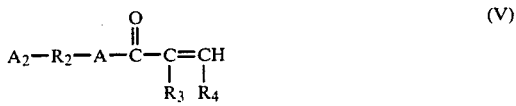

$$A_2-R_2-A-\overset{O}{\overset{\|}{C}}-\underset{R_3}{C}=\underset{R_4}{CH} \quad (V)$$

where $A_2$ is HO— or R'—NH— and $R_2$, A, $R_3$ and $R_4$ are as above defined. Occasionally, it is desirable to employ a substantial excess of the diisocyanate of formula IV in this reaction, in order to minimize the formation of by product, and subsequently isolate the compound of formula III from the resulting reaction mixture by precipitation thereof, or by distilling off the excess isocyanate. The reaction between the compound IV and compound V can be conducted at a temperature between about 0° C. and 100° C. in the presence or absence of an inert solvent. Suitable solvents include toluene, cyclohexane, methyl acetate, ethyl acetate, tetrahydrofuran, isopropylacetate, diethylether and the like. If desired, the reaction between IV and V may be conducted in the presence of a urethane catalyst of the type described above.

The compounds of formula IV and V are well known in the art. Suitable diisocyanates of formula IV include hexane-1,6-diisocyanate, tetramethylene diisocyanate, phenylene 1,4-diisocyanate, toluene-2,4-diisocyanate, toluene-2,6-diisocyanate, isophorone diisocyanate, cyclohexane 1,4-diisocyanate, and the like.

Suitable compounds of formula V include hydroxyethyl acrylate, hydroxypropyl acrylate, 4-hydroxyphenyl methacrylate, 2-hydroxyethyl maleate, hydroxyethyl methacrylate, t-butylaminoethyl methacrylate, and the like.

Many of the compounds of formula III wherein n is 0 are known or can be prepared by methods known in the art. Known compounds include 2-isocyanatoethyl methacrylate, 2-isocyanatoethyl acrylate, 3-isocyanatopropyl methacrylate, isocyanatobutyl acrylate and methacrylate, isocyanatohexyl acrylate and methacrylate, 1-methyl-2-isocyanatoethyl methacrylate and 1,1-dimethyl-2-isocyanatoethyl acrylate.

The compounds of formula III wherein n is 0 can generally be prepared by esterification of acryloyl or methacryloyl chloride with substantially equal molar amounts of the appropriate alkanol amine of formula (VI)

$$H_2N-R_1(A_1-R_2)_{\overline{n}}OH \quad (VI)$$

under acidic conditions followed by phosgenation, as described in U.S. Pat. No. 2,821,544 (1958). The compounds of formula (VI) are conventional and well known in the art. More specifically the esterification reaction as well as the phosgenation reaction is run using an inert, dry, high-boiling solvent such as toluene, xylene, chlorobenzene or dichlorobenzene at 50°–200° for 1 to 20 hours. The alkanol amine can either be added in the salt form, preferably the hydrochloride salt, or the free form with the solvent saturated with the dry acid e.g. dry HCl gas. After formation of the ester, excess phosgene is passed into or over the rapidly stirring suspension (or solution) at 50°–200° C. for 1 to 20 hours until evolution of hydrogen chloride ceases. The product is isolated by distillation.

The polyvinyl alcohol derivative of formula I is converted into a crosslinked polymeric hydrogel material, particularly useful as contact lens materials, by methods known to the art.

Thus, the polyvinyl alcohol derivative of formula I can be dissolved in a suitable organic solvent, such as lower alkanols, such as ethanol, methanol or the like, or an aprotic solvent such as dimethyl formamide, acetamide, acetonitrile, dimethylacetamide, dimethylsulfoxide or mixtures thereof. Also aqueous/organic solvent systems may be employed.

The solution of polyvinyl alcohol derivative of formula I is advantageously placed into a mold in shape of a contact lens. Where the solvent employed is a strong swelling solvent, such that the resultant crosslinked polymer shrinks in size upon equilibration with aqueous or aqueous saline solution, typically between about 10 to about 35 percent based on diameter, the mold is suitably enlarged to compensate for the post treatment shrinkage. Optimally the post treatment further includes a heat treatment of the molded lens shaped crosslinked polymer. Such heat treatment is characteristically conducted at a temperature between about 60° and 110° C., e.g. in the presence of an aqueous medium. This treatment may result in a further slight shrinkage, generally less than 15% based on diameter. The treatment time can vary greatly, but usually is accomplished in about 5 to 90 minutes. The purpose of this post treatment is to dimensionally stabilize the crosslinked contact lens material. Also, the treatment may further serve to sterilize such lens material.

As mentioned above, the solution of polyvinyl alcohol derivative of formula I is advantageously placed into a mold. The mold may be a conventional spin-casting mold for preparing contact lenses such as described in U.S. Pat. No. 3,408,429, or in a static mold, e.g. as described in U.S. Pat. No. 4,347,198. Alternately, one may prepare a cross-linked swollen lens blank, dry the lens blank to form the corresponding xerogel, shape the xerogel into a contact lens precurser by lathing methods known to the art, and swell the shaped xerogel in aqueous medium to form the corresponding contact lens, as described in Reissue U.S. Pat. No. 27,401.

The crosslinking of the solvent solution of the polymer of formula I is conducted advantageously in the presence of a conventional free radical initiator, such as a peroxide, e.g. di-tert-butyl peroxide, benzoyl peroxide, lauryl peroxide, decanoyl peroxide, acetyl peroxide, succinic acid peroxide, methyl ethyl ketone peroxide, 2,4-dichlorobenzoyl peroxide, isopropyl peroctoate, tert-butyl hydroperoxide, tert-butyl perpivalate, tert-butyl peroctoate, diisopropyl peroxydicarbonate, cumene hydroperoxide, tert-butyl perbenzoate, tert-butyl peroxymaleic acid, tert-butyl peroxyacetate, and potassium persulfate, an azo compound, e.g. 2,2-azo-bis-isobutyronitrile, 2,2'-azo-bis-(2,4-dimethylvaleronitrile), 1,1'-azo-bis-(cyclohexane carbonitrile), 2,2'-azo-bis-(2,4-dimethyl-4-methoxyvaleronitrile) and phenyl azo isobutyronitrile, a photoinitiator, e.g. benzoin methyl ether and 1-hydroxycyclohexylphenyl ketone or actinic radiation such as UV light or ionizing rays e.g. gamma rays or x-rays.

Optionally, an additional conventional polyreactive crosslinking agent may be added, such as, allyl compounds e.g. allyl methacrylate, diallyl itaconate, monoallyl itaconate, diallyl maleate, diallyl fumarate, diallyl succinate, diallyl phthalate, triallyl cyanurate, triallyl isocyanurate, diethylene glycol bis-allyl carbonate, triallyl phosphate, triallyl trimellitate, allyl ether, N,N-diallylmelamine; vinyl compounds, e.g. divinyl benzene, N,N'-methylene bis acrylamide, ethylene glycol dimethacrylate, neopentylglycol dimethacrylate, tetraethylene glycol dimethacrylate, hexamethylene bis maleimide, divinyl urea, bisphenol A bis methacrylate, divinyl adipate, glycerin trimethacrylate, trimethylolpropane triacrylate, trivinyl trimellitate, 1,5-pentadiene, 1,3-bis(4-methacryloxybutyl)tetramethyl disiloxane, divinyl ether and divinyl sulfone; hydroxyl reactive compounds such as: polyvalent isocyanates e.g. hexamethylene diisocyanate, isophorone diisocyanate, toluene diisocyanate; polyaldehydes e.g. glutaraldehyde and glyoxal; polyacids e.g. glutaric acid and oxalic acid; polyepoxides e.g. butane diepoxide, vinylcyclohexene dioxide and butanediol diglycidyl ether; polyols (acid catalysis) e.g. dimethylol urea and diethylene glycol.

When employed, about 0.01 to 10 weight percent of crosslinking agent, based upon the weight of formula I derivative, may be present, preferably about 0.01 to about 5 percent, most preferably about 0.05 to 2 weight percent.

The resultant contact lenses are optically clear, strong, flexible, highly oxygen permeable and wettable. Further, the instant lenses are characterized by their ease of manufacture.

In the following examples, all parts are by weight unless otherwise described.

The following example illustrates a range of water contents obtained using different levels of isocyanatoethyl methacrylate (IEM) with a PVA of weight average molecular weight (MW) of ~26,000.

3 g Air Products Vinol ® 107 (MW=26,000, 98.6% hydrolyzed) PVA is dissolved in 27 g Aldrich Gold Label (99.9%) DMSO under house nitrogen at 60° C. (approximately 0.5 hour) in a three neck round bottom flask with overhead stirring. The solution is allowed to cool to room temperature (RT) (approximately 1 hr.). Then 2.6 (0.25 ml) 3.6 (0.35 ml), 5.2 (0.5 ml), 6.2 (0.6 ml), or 10.4 (1 ml) mole % (with respect to vinyl alcohol), Dow Chemical Developmental Monomer, isocyanatoethyl methacrylate (IEM), is added dropwise over 1.5 minutes and reacted at RT for 1 hour with vigorous stirring.

A given amount of IEM reacted PVA in DMSO is combined with initiator (1-hydroxycyclohexylphenyl ketone), mixed well, poured into flat "sandwich" molds and polymerized with UV light (360 nm) at RT for 1 hour. The initiator is listed as a percent of the total reaction solution.

The polymerized films are removed from the molds and extracted successively in 50%, 25%, 0% DMSO/water solutions. They are extracted several times in $H_2O$ and boiled for 10 minutes before % $H_2O$ content is determined.

Diameters are measured on disks cut from films before extraction and after boiling.

EXAMPLE 1

| | PVA = Air Products Vino ® 107 22-31,000 MW/98-98.8% Hydrolyzed | | | |
|---|---|---|---|---|
| Sample # | Mole % IEM | % Initiator | % $H_2O$ | % Diameter Change (Initial to Boiled) |
| 1 | 2.6 | 0.05 | 85.14 | −12.0 |
| 2 | 3.6 | 0.03 | 83.63 | −13.0 |
| 3 | 5.2 | 0.03 | 79.32 | −17.3 |
| 4 | 6.2 | 0.03 | 76.20 | −19.4 |
| 5 | 10.4 | 0.04 | 74.80 | — |

As shown above, with increasing IEM concentration, the water content of films steadily decreases from ~85% (2.6 mole % IEM) to ~75% (10.4 mole % IEM). Also as the corresponding water content decreases the diameter changes become larger.

The following example shows a range in water content achieved using a PVA, weight average molecular weight (MW)=86,000 (100% hydrolyzed) modified with different levels of isocyanatoethyl methacrylate (IEM) and then polymerized. Films are made as in Example 1 except that 3 g of Scientific Polymer Products 86,000 MW PVA is dissolved in 37 g DMSO and IEM is diluted with DMSO before addition.

EXAMPLE 2

| | PVA = Scientific Polymer Products 86,000 MW/100% Hydrolyzed | | | |
|---|---|---|---|---|
| Sample # | Mole % IEM | % Initiator | % $H_2O$ Content | % Diameter Change (Initial to Boiled) |
| 1 | 2.6 | 0.03 | 84.33 | −19.1 |
| 2 | 10.4 | 0.03 | 74.57 | −21.5 |

As shown above, the water content decreases from ~84 (2.6% IEM) to ~75 (10.4% IEM) with a corresponding % diameter change of −19.1 and −21.5. Tensile properties of films made from this mixture are highly dependent on % IEM incorporation. At low (2.6%) IEM the films are elastic and weak but at high (10.4%) IEM incorporation the films are brittle and weak.

The following example shows the effect of partially hydrolyzed PVA on the copolymer product. Films are made as in Example 1 except that Vinol ® 205 (87-89% hydrolyzed) of weight average molecular weight (MW) 22-31,000 is used.

EXAMPLE 3

| | PVA = Air Products Vino ® 205 22-31,000 MW/87-89% Hydrolyzed | | | |
|---|---|---|---|---|
| Sample # | Mole % IEM | % Initiator | % $H_2O$ Content | % Diameter Change (Initial to Boiled) |
| 1 | 10.4 | 0.04 | 71.94 | −22.4 |

On comparing the above table with Example 1 it can be seen that lowering the percent hydrolysis has little effect on water content. There is no difference in the mixing (related to a lower PVA solution viscosity) of this lesser hydrolyzed compared to the fully hydrolyzed PVA of the same molecular weight.

The following example shows the effect of isocyanatoethyl methacrylate (IEM) level on water content. Films are made as in Example 1 using Scientific Polymer Products weight average molecular weight (MW) 14,000 (100% hydrolyzed) PVA and the following additional levels of IEM: 12.4 (1.2 ml), 14.5 (1.4 ml), 16.6 (1.6 ml), 18.6 (1.8 ml) and 20.7 (2.0 ml) mole % (with respect to vinyl alcohol) IEM.

EXAMPLE 4

| Mole % IEM | % Initiator | % $H_2O$ Content |
|---|---|---|
| 2.6 | 0.03 | 86.1 |
| 3.6 | 0.04 | 84.1 |
| 5.2 | 0.05 | 79.0 |
| 6.2 | 0.06 | 77.0 |
| 10.4 | 0.03 | 75.1 |
| 12.4 | 0.03 | 73.2 |
| 14.5 | 0.04 | 70.0 |
| 16.6 | 0.04 | 68.6 |
| 18.6 | 0.03 | 67.6 |
| 20.7 | 0.03 | 60.7 |

As IEM modification is increased from 2.7 to 20.7 mole %, the water content of the final polymerized sheet decreases in a fairly uniform manner from 86% to 61%. This decrease can be explained by the hydrophobic character of IEM. In each case, the resulting sheet (0.3 mm thick) is flexible.

EXAMPLE 5

This example illustrates the effect of high isocyanatoethyl methacrylate (IEM) content on various physical properties of films. PVA solutions are made according to Example 1 with PVA solution concentrations as listed in the following table. IEM is added dropwise under nitrogen and % IEM content by weight can be determined from the table. Sheets are polymerized as in Example 1 with benzoin methyl ether (initiator) as indicated in the table below. Both 90 and 95 mole % IEM-PVA solutions contain unreacted isocyanate as indicated by I.R. spectroscopy.

| PVA-IEM Hydrogel: High IEM Content Using VINOL ® 107 | | | | | | |
|---|---|---|---|---|---|---|
| Wt. % PVA in DMSO | Mole % IEM | Wt. % PVA-IEM in DMSO | Initiator % | % $H_2O$ Content | % Diameter Change Initial to Boiled | Observations (0.3 mm thick sheets) |
| 10.0 | 50 | 23.5 | 0.08 | 37.06 | −27.4 | clear, cracked on bending* |
| 7.5 | 75 | 22.8 | 0.05 | 33.67 | −29.0 | clear, cracked on bending* |
| 6.8 | 90 | 23.4 | 0.05 | 43.57 | −24.3 | clear, cracked on bending** |

-continued

PVA-IEM Hydrogel: High IEM Content Using VINOL ® 107

| Wt. % PVA in DMSO | Mole % IEM | Wt. % PVA-IEM in DMSO | Initiator % | % H₂O Content | % Diameter Change Initial to Boiled | Observations (0.3 mm thick sheets) |
| --- | --- | --- | --- | --- | --- | --- |
| 2.9 | 95 | 11.3 | 0.08 | 63.55 | −28.0 | hazy, cracked on bending** |

*This composition when made into a thin (0.07 mm thick) sheet can be bent without cracking.
**These compositions when made into a 0.02 mm thick sheet can be bent without cracking.

As shown above, clear films can be made using up to 95 mole % IEM. Water content is also sensitive to the solid content in the reaction mixture.

EXAMPLE 6

Preparation of Reaction Product of 2,4 toluene diisocyanate with 2-hydroxyethyl methacrylate: (3-isocyanato-p-tolyl)carbamoyloxyethyl methacrylate (TDI-HEMA).

5.81 g (0.033 moles) 2,4 toluene diisocyanate (TDI) is dissolved in 5.04 g isopropyl acetate at room temperature and to this is added 2.18 g (0.017 moles) 2-hydroxyethyl methacrylate (HEMA) and the mixture stirred 16 hours at room temperature. A white precipitate appears during the reaction. The mixture is cooled to 5° and left standing for 16 hours. The precipitate is filtered, washed with cold toluene and hexane and dried yielding 2 g of crystalline product having a melting point of 69°–70° C. (U.S. Pat. No. 4,008,247, m. pt. 71°–72° C.). An I.R. of the compound in DMSO has a large isocyanate peak at 2270 cm$^{-1}$. NMR results suggest that 91 mole % (95 wt. %) of the product is the monoadduct of 2-hydroxyethyl methacrylate and 2,4 toluene diisocyanate (para to the methyl group).

EXAMPLE 7

In sample 1, 0.41 g of reaction product of Example 6 is dissolved in 1 ml of dimethylsulfoxide (Aldrich, Gold Label) and this solution added dropwise over a period of 1 minute to 15 ml of a rapidly stirring 10% Air Products Vinol ® 107/DMSO solution. The mixture is allowed to react at room temperature for 1 hour (complete disappearance of isocyanate IR band at 2270 cm$^{-1}$). Benzoin methyl ether (BME), 0.008 g, is dissolved in 2.6 g of the solution and the mixture poured into sandwich molds and irradiated (360 nm) for 1 hour. The other samples are made in a similar manner.

As shown above in Sample 3, TDI-HEMA crosslinks PVA into a flexible strong, pale yellow film when reacted at a level of approximately 12 mole percent with respect to vinyl alcohol units.

EXAMPLE 8

Preparation of Reaction Product of isophorone diisocyanate (IPDI) with 2-hydroxyethyl methacrylate: An isocyanatoisophoronylcarbamoyloxyethyl methacrylate (IPDI-HEMA)

5.83 g (0.045 mole) 2-hydroxyethyl methacrylate (HEMA) is combined with 5.04 g (0.0227 mole) IPDI and stirred at room temperature for 65 hours. An isocyanate titration at this point shows 39% unreacted. The proton NMR data of the reaction mixture is consistent with the monoadduct formation approximately equally distributed at both isocyanates. Attack at the second site, i.e. diadduct formation, appears to be a slower process.

EXAMPLE 9

0.65 g of the isocyanatoisophoronylcarbamoyloxyethyl methacrylate (IPDI-HEMA) of Example 8 is slowly added to 5 g of a rapidly stirring 10% Vinol ® 107/DMSO solution at room temperature and allowed to react for 1 hour (complete disappearance of isocyanate IR band at 2270 cm$^{-1}$). To this solution is dissolved 0.026 g benzoin methyl ether (BME) and the solution poured into a sandwich mold and irradiated (360 nm) for 45 minutes at room temperature. The resultant gel is equilibrated in water.

| Sample | Wt. % in Reaction Mixture | | | | Observation |
| --- | --- | --- | --- | --- | --- |
| | IPDI-HEMA | PVA | DMSO | BME | |
| 1 | 11.45 (10 mole % of vinyl alcohol units) | 8.8 | 79.3 | 0.45 | Film: clear, colorless flexible, strong hydrogel |
| 2 (control) | 11.6 | — | 87.8 | 0.6 | No film, remains a |

| Sample | Wt. % TDI-HEMA* Reaction Product | Mole % TDI-HEMA to Alcohol Units | Wt. % PVA | Wt. % DMSO | Wt. % BME | Observation After Irradiation |
| --- | --- | --- | --- | --- | --- | --- |
| 1 | 2.5 | 3.7 | 9.1 | 88.1 | 0.3 | Yellow solution, film not formed |
| 2 | 3.9 | 5.9 | 9.1 | 86.6 | 0.4 | Soft, tacky pale yellow gel |
| 3 | 7.3 | 12.3 | 8.2 | 84.3 | 0.3 | Film: transparent, pale yellow, flexible, strong when swelled in water |
| Control | | | | | | |
| 4 | 7.6 | — | — | 91.9 | 0.5 | Yellow solution, film not formed |

*(3-isocyanato-p-tolyl) carbamoyloxyethyl methacrylate

-continued

| Sample | Wt. % in Reaction Mixture | | | | Observation |
|---|---|---|---|---|---|
| | IPDI-HEMA | PVA | DMSO | BME | |
| | | | | | liquid |

[4] Assuming 60% of isocyanate groups reacted and diadduct formation slow i.e. 50% reaction corresponds to 100% monoadduct. One then has 40 mole % HEMA, 40 mole % monoadduct and 10 mole % diadduct. Hence, the monoadduct is calculated to be present as 58 wt. % of the reaction product i.e. 0.58 × 11.45 = 6.64 wt. %, and then, 100 × (mole monoadduct/mole vinyl alcohol units) =

$$\left(\frac{6.64}{352} \Big/ \frac{8.8}{44}\right) \times 100 = 10 \text{ mole \%}$$

As shown in sample 1 of the above table the isocyanatoisophoronyl carbamoyloxyethyl methacrylate reacts with PVA, and the derivatized PVA is cross-linked by U.V. light into a gel. This gel forms a clear, colorless, flexible, strong film on equilibration with water.

EXAMPLE 10

3 of PVA Vinol ® 107 is dissolved in 27 g of DMSO at 60° C. under nitrogen. After the solution is cooled to room temperature 500 μl allyl isocyanate (Aldrich, 98%) (13.5 mole % isocyanate with respect to vinyl alcohol units) is slowly added and allowed to react for 3 days at room temperature (complete disappearance of isocyanate IR band at 2270 cm$^{-1}$). Methyl methacrylate and initiator are dissolved in this solution in proportions indicated in the table below. The solutions are poured into sandwich molds and U.V. irradiated for 1 hour at room temperature. As a comparison sample, allyl isocyanate (undiluted) with added initiator is irradiated for 5 hours at room temperature.

| Sample | Allyl Wt. % | Isocyanate Mole % | PVA Wt. % | MMA Wt. % | Initiator Wt. % | DMSO Wt. % | Observation |
|---|---|---|---|---|---|---|---|
| 1 | 1.6 | 13.5 | 9.83 | — | 0.03[1] | 88.54 | Liquid no film or gel |
| 2 | 1.6 | 13.5 | 9.73 | 1.06 | 0.03[1] | 87.58 | ↓ |
| 3 | 3.8 | 21.0 | 9.58 | — | 0.4[2] | 86.23 | ↓ |
| 4 | 98.9 | — | — | — | 1.1[1] | 0 | ↓ |

[1] 1-hydroxycyclohexylphenyl ketone
[2] benzoin methylether

As shown above (Samples 1 to 3), the allyl derivatived PVA is not U.V. crosslinked into a gel. Also allyl isocyanate itself (neat) is not polymerized into a gel (sample 4).

The following example shows the synthesis of a film with added crosslinking agent, i.e., ethyleneglycol dimethacrylate (EGDMA). The film is made as in Example 1.

EXAMPLE 11

| Mole % IEM | Wt. % PVA | Wt. % EGDMA | Wt. % Initiator+ | % H$_2$O Content | % Diameter Change (Initial to Boiled) | Observation |
|---|---|---|---|---|---|---|
| 6.2 | 98.4 | 1.6 | 0.04 | 82.62 | −15.4 | clear, very flexible film |

+ benzoin methyl ether

As shown above additional crosslinking agent may be incorporated in the system with no adverse affect on clarity or flexibility.

EXAMPLE 12

Preparation of Reaction Product of 2,4 toluene diisocyanate with t-butyl-aminoethyl methacrylate: [(3-isocyanato-p-tolyl) t-butylureido]ethyl methacrylate (TDI-tBAEM)

2.08 g (0.012 moles) 2,4 toluene diisocyanate (TDI) is dissolved in 5.04 g isopropyl acetate at room temperature. The solution is cooled in dry ice and 2.37 g (0.013 moles) t-butylaminoethyl methacrylate (tBAEM) is added dropwise in the cold mixture. The mixture is left 1.5 hr. in dry ice and slowly warmed to room temperature. A white precipitate is formed during this process. The mixture is cooled to −15° C. at which point the precipitate is filtered, washed with cold hexane and dried yielding 2.37 g of crystalline product having a melting point of 98°–99° C. An I.R. of the compound in chlorobenzene showed a large isocyanate peak at 2270 cm$^{-1}$. NMR results suggest that 90 mole %*(~90 wt. %) of the product is the monoadduct of 2,4 toluene diisocyanate and t-butylaminoethyl methacrylate (para to the methyl group).

*Note: The other 10 mole % consists of a combination of monoadduct at the other site and diadduct.

EXAMPLE 13

In sample 1, 0.59 g of the reaction product of Example 12 is suspended in 2 ml of dimethyl sulfoxide (Aldrich, Gold Label) and this solution injected into 5 ml of rapidly stirring 10% Air Products Vinol ® 107/DMSO solution under nitrogen. The mixture is allowed to react at room temperature for 2 hours during which time the suspension turns to a clear solution. Benzoin methyl ether (BME), 0.008 g, is dissolved in 3.08 g of this solution and the mixture poured into sandwich molds and irradiated (360 mm) for 1 hour. The control is made in a similar fashion without PVA present.

| | Wt. % TDI-tBAEM* Reaction Product | Mole % TDI-tBAEM to Alcohol Units | Wt. % PVA | Wt. % DMSO | Wt. % BME | Observation After Irradiation |
|---|---|---|---|---|---|---|
| Sample | | | | | | |
| 1 | 6.48 | ~13 | 7.77 | 85.49 | 0.26 | Soft, pale-yellow gel |
| | | | | | | Strong, trans- |

-continued

| | Wt. % TDI-tBAEM* Reaction Product | Mole % TDI-tBAEM to Alcohol Units | Wt. % PVA | Wt. % DMSO | Wt. % BME | Observation After Irradiation |
|---|---|---|---|---|---|---|
| | | | | | | parent, yellow film when swelled in water |
| Control 2 | 12.68 | — | — | 86.65 | 0.67 | Pale yellow solution |

*[(3-isocyanato-p-tolyl)t-butylureido]ethyl methacrylate

A shown above in sample 1, TDI-tBAEM crosslinks PVA into a transparent, yellow film which becomes strong after equilibration in water.

EXAMPLE 14

Prototype lenses are fabricated in contact lens molds (TPX) made from poly(α-methyl pentene). The reaction solution is made as in Example 1 with 2.02 g of a 10% Vinol ® 107 solution in DMSO modified with 10.4 mole % isocyanatoethyl methacrylate and with 0.0014 g benzoin methyl ether (initiator). The solution is pipetted into lens molds and UV cured for 1¼ hours at room temperature. The clear lenses are removed from the molds, washed in water and boiled for 10 minutes. The water swollen lenses are clear and resilient.

We claim:

1. An organic aprotic solvent soluble polymer which is a derivative of a polyvinyl alcohol having a weight average molecular weight of at least about 2,000, containing an effective amount between about 0.5 to about 20 percent, based on the number of hydroxyl groups on said polyvinyl alcohol, of units of the formula

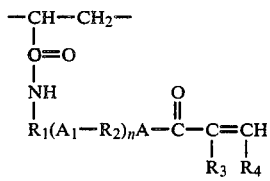
(I)

wherein

R$_1$ and R$_2$ are independently straight or branched chain alkylene of 2 to 8 carbon atoms, arylene of 6 to 12 carbon atoms, a saturated cycloaliphatic divalent group of 6 to 10 carbon atoms, aralkylene of 7 to 14 carbon atoms, or aralkarylene of 13 to 16 carbon atoms;

n is 0 or 1;

A$_1$ is $$-\text{NHC}(=O)-O- \text{ or } -\text{NHC}(=O)-N(R')-$$

where R' is hydrogen or lower alkyl;

A is —O—, —NH— or $$-\text{NHCON}(R'')-$$

where R" is hydrogen or lower alkyl;

R$_3$ is hydrogen or methyl; and

R$_4$ is hydrogen, methyl or —COOR$_5$ where R$_5$ is hydrogen or lower alkyl with the proviso that when R$_3$ is methyl then R$_4$ is hydrogen.

2. A polymer according to claim 1, wherein R$_1$ and R$_2$ are alkylene of 2 to 6 carbon atoms.

3. A polymer according to claim 1, wherein n is 0.

4. A polymer according to claim 1, wherein n is 1 and A$_1$ is carbamoyloxy.

5. A polymer according to claim 1, wherein A is —O—.

6. A polymer according to claim 1, wherein n is 0, R$_1$ is alkylene of 2 to 6 carbon atoms, A is —O—, R$_3$ is methyl and R$_4$ is hydrogen.

7. A polymer according to claim 6, wherein R$_1$ is ethylene.

8. A polymer according to claim 1 wherein said polyvinyl alcohol has a weight average molecular weight of at least 10,000.

9. A polymer according to claim 8, wherein said polyvinyl alcohol has a weight average molecular weight of up to 100,000.

10. A polymer according to claim 9, wherein n is 0, R$_1$ is ethylene, A is —O—, R$_3$ is methyl and R$_4$ is hydrogen.

11. A crosslinked polymeric hydrogel material, prepared by crosslinking a polymer according to claim 1.

12. A crosslinked polymeric hydrogel material, prepared by crosslinking a polymer according to claim 6.

13. A crosslinked polymeric material, prepared by crosslinking a polymer according to claim 10.

* * * * *

UNITED STATES PATENT AND TRADEMARK OFFICE
CERTIFICATE OF CORRECTION

PATENT NO. : 4,670,506

DATED : JUNE 2, 1987

INVENTOR(S) : MERRILL GOLDENBERG, KARL F. MUELLER

It is certified that error appears in the above-identified patent and that said Letters Patent is hereby corrected as shown below:

In the abstract
In Column 3, lines 3-10 and
In claim 1, column 15, line 7, correct formula I to read --

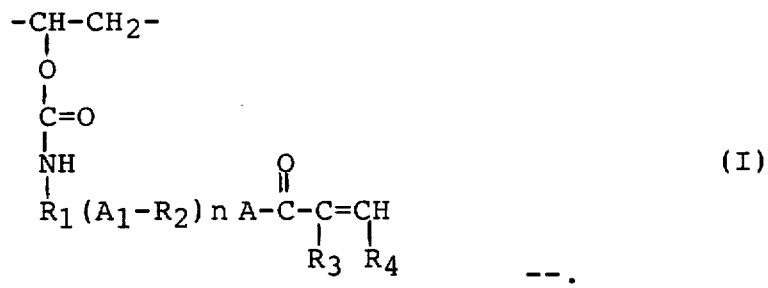

--.

Signed and Sealed this

Fifth Day of April, 1988

Attest:

DONALD J. QUIGG

Attesting Officer   Commissioner of Patents and Trademarks